Figure 1:
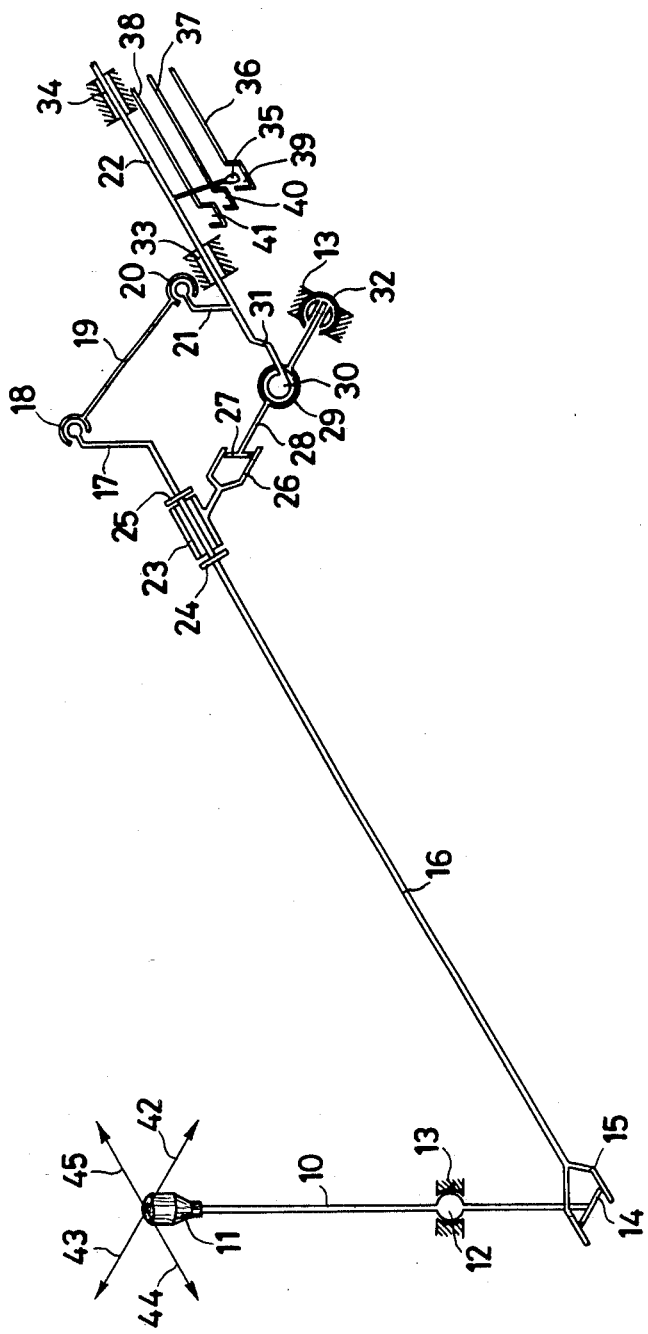

United States Patent [19]

Ferrario

[11] Patent Number: 4,653,341
[45] Date of Patent: Mar. 31, 1987

[54] DEVICE FOR MANUALLY CONTROLLING A MOTOR VEHICLE CHANGE-SPEED GEAR UNIT

[75] Inventor: Luciano Ferrario, Rho, Italy

[73] Assignee: Alfa Romeo Auto S.p.A., Naples, Italy

[21] Appl. No.: 744,967

[22] Filed: Jun. 17, 1985

[30] Foreign Application Priority Data

Jun. 20, 1984 [IT] Italy ................................ 21509 A/84

[51] Int. Cl.⁴ .............................................. G05G 9/16
[52] U.S. Cl. .................................................. 74/473 R
[58] Field of Search ...................... 74/473 R, 473 SW; 180/336

[56] References Cited

U.S. PATENT DOCUMENTS

| | | | |
|---|---|---|---|
| 2,180,116 | 11/1939 | Lapsley | 74/473 R |
| 2,399,613 | 5/1946 | Backus et al. | 74/473 R |
| 2,896,469 | 7/1959 | Norrie | 74/473 R |
| 3,645,145 | 2/1972 | Galas | 74/473 R |
| 3,805,635 | 4/1974 | Grosseau | 74/473 R |
| 4,348,915 | 9/1982 | Leitermann et al. | 74/473 R |
| 4,509,384 | 4/1985 | Lamy et al. | 74/473 R |

*Primary Examiner*—Allan D. Herrmann
*Attorney, Agent, or Firm*—Charles E. Brown; Charles A. Brown

[57] ABSTRACT

In a device for manually controlling a motor vehicle change-speed gear unit, the gear lever is connected to the gear selector and engagement shaft by two motion transmission linkages, one for controlling its rotary movements for gear selection, and the other for controlling its translational movements for gear engagement.

5 Claims, 2 Drawing Figures

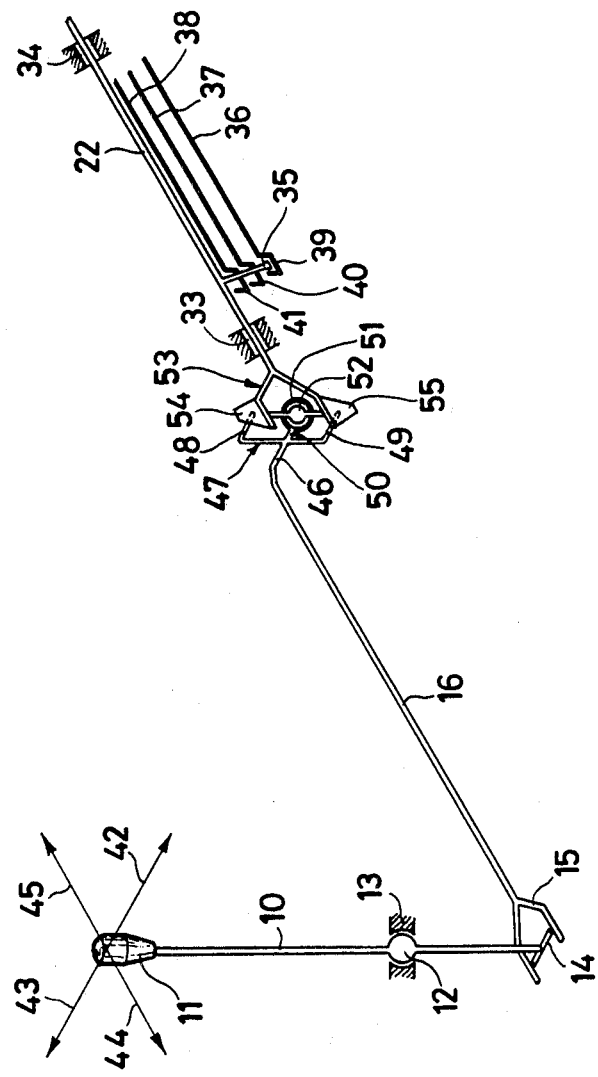

DEVICE FOR MANUALLY CONTROLLING A MOTOR VEHICLE CHANGE-SPEED GEAR UNIT

This invention relates to a device for manually controlling a motor vehicle change-speed gear unit of the type constituted by a manually operable gear lever rotatably supported in the vehicle structure, a connection rod pivoted at one end to said lever, and a selector and engagement shaft which is rotatable and slidable in its supports in order selectively to engage with gear engagement rods, and is operationally connected to said connection rod.

In order to select gears with these known devices, the gear lever is moved in a determined direction and, by way of the connection rod, rotates the selector and engagement shaft about its axis in order to engage it with one of the engagement rods (generally three in number). In order to engage the gear, the gear lever is moved in another direction perpendicular to the first, and by way of the connection rod causes the selector and engagement shaft to translate along its axis, and with it the previously selected engagement rod in order to engage the required gear.

A design of this type is constructionally very simple, but because of space restrictions the selector and engagement shaft can not always be aligned with the connection rod, especially if the gearbox is disposed some distance from the gear lever. In these cases, a certain lever arm exists between the connection rod and the selector and engagement shaft, and difficulties can arise during the engagement procedure, such as bending of the selector and engagement shaft in its supports because of the bending stresses to which it is subjected by virtue of the eccentricity of the tractive and compressive forces exerted by the connection rod during the engagement operations.

The object of the present invention is a device which obviates the aforesaid drawbacks while maintaining a certain constructional simplicity.

To attain this object, the invention proposes a device of the aforesaid type in which the selector and engagement shaft is connected to the connection rod by a first motion transmission linkage which causes it to rotate about its axis, and by a second motion transmission linkage which causes it to translate along the same axis.

The device according to the invention therefore still comprises a single connection rod pivoted to the gear lever, whereas it comprises two linkages connected to said rod in order to separately control the rotary and translatory movements of the selector and engagement shaft.

According to a preferred embodiment, said first motion transmission linkage is of the articulated parallelogram type and comprises a first crank rigid with said connection rod, a second crank rigid with said selector and engagement shaft, and a bar pivoted to the two cranks.

Again according to a preferred embodiment, said second motion transmission linkage comprises a lever rotatable and slidable in its end support, said lever being pivoted to the connection rod and being hinged to the selector and engagement shaft.

With this embodiment, by means of a single connection rod it is possible to separately control the rotary movements and the translational movements of the selector and engagement shaft, the former in order to select the required gear, and the latter in order to engage the selected gear.

Thus the selector and engagement shaft is operated correctly, and is not subjected to undesirable stresses.

Characteristics and advantages of the invention are described in greater detail hereinafter with reference to the accompanying drawings, which show two preferred embodiments of the invention by way of non-limiting example, and in which:

FIG. 1 is a perspective diagrammatic view of a control device for a change-speed gear unit according to the invention; and FIG. 2 is a modification of the device of FIG. 1.

In FIG. 1, the reference numeral 10 indicates the manual gear lever of a motor vehicle change-speed gear unit, not shown. The lever 10 is provided with a knob 11, by means of which it is operated by the vehicle driver. The lever 10 is rotatably supported in the vehicle structure 13 by a ball joint indicated by 12.

A connection rod indicated by 16 is secured to the lever 10 by a pin 14 and fork 15. The rod 16 is operationally connected to a gear selector and engagement shaft 22 by means of a crank 17 rigid with the rod 16, a bar 19 pivoted at 18 to said crank 17, and a crank 21 pivoted at 20 to the bar 19 and rigid with the shaft 22.

The reference numeral 23 indicates a sleeve which is rotatably supported by the rod 16 and is dragged axially by said rod by means of shoulders 24 and 25 rigid with the rod 16. A fork 26 is rigid with the sleeve 23 and is connected to a lever 28 by means of a pin 27. Thus, the lever 28 is pivoted relative to the connecting rod 16 by the sleeve 23.

The socket 29 of a ball joint 30 is rigid with the lever 28, the ball being rigidly connected to the selector and engagement shaft 22 by an arm 31. Thus, the lever 28 is hinged relative to the shaft 22. The lever 28 is rotatably supported in the vehicle structure 13 by a ball joint 32, which also allows it to make limited axial movements.

The shaft 22 is rotatably and slidably supported in the vehicle structure by cylindrical bearings 33 and 34, and is provided with a finger 35 which engages, as required, with one of the three gear engagement rods 36, 37, 38. For this purpose, the rods are provided with respective cavities indicated by 39, 40, 41. The three rods 36, 37, 38 serve respectively for engaging the first and second gear, the third and fourth gear, and the fifth and reverse gear. For this purpose, the rods are provided with forks, which are not shown because they are of known type.

During gear shifting, in order to select the gears, and starting from the idle position shown in FIG. 1, the gear lever 10 is rotated about the joint 12 so that it moves in the direction of the arrows 42 and 43 in a plane which contains said arrows and the axis of the joint 12. The arrow 42 indicates the movement for selecting the first or second gear, and the arrow 43 indicates the movement for selecting the third or fourth gear, and also for selecting the fifth or reverse gear.

These movements of the gear lever 10 cause the rod 16 to make rotary movements about its axis in an anti-clockwise or clockwise direction. The rod 16 itself rotates the shaft 22 by way of the linkage constituted by the cranks 17 and 21 and bar 19, with an angular amplification ratio, with respect to the rotary movements of the lever 10, which depends on the ratio of the lengths of said cranks 17 and 21. In rotating about its axis, the shaft 22 causes the finger 35 to engage with one of the rods 36, 37, 38, by becoming inserted into the respective cavity 39, 40, 41.

In order to engage the selected gear, the gear lever 10 is rotated about the joint 12 and moved in the direction of the arrows 44 and 45, in a plane which contains said arrows and the axis of the joint 12. The arrow 44 indicates the movement for engaging the first, third or fifth gear, and the arrow 45 indicates the movement for engaging the second, fourth or reverse gear.

These movements of the gear lever 10 cause the rod 16 to undergo forward or backward translatory movement along its axis. The rod 16 causes the shaft 22 to slide axially forwards or backwards by way of the sleeve 23, the fork 26, the pin 27, the lever 28, the socket 29, the ball 30 and the arm 31.

On moving axially, the shaft 22, by means of the finger 35, thrusts the previously selected rod 36, 37 or 38 so that it moves axially forwards or backwards so as to cause the respective fork to engage the chosen gear.

As illustrated, the selector and engagement shaft 22 is not aligned with the connection rod 16, but is made to undergo rotary movement about its axis and translatory movement along its axis by said rod without being subjected to undesirable forces because its movements are congruent with those of the rod and are freely allowed by the constraints and by the motion transmission linkages which connect it operationally to said rod.

In this respect, during the gear selection and engagement procedure the rod 16 rotates about its axis and translates along it, but also moves transversely to said axis, these translational movements being allowed by the connection between the lever 28 and shaft 22 formed by the ball joint 30, and by the connection between the lever 28 and the vehicle structure 13 formed by the sliding joint 32.

In FIG. 2, the elements common to the two devices are indicated by the same reference numerals as used in FIG. 1.

In this case, the rod 16 comprises at the opposite end to the fork 15 a bent portion 46 rigid with a fork, indicated overall by 47, which is provided with two lateral arms 48 and 49 and a central arm 50. To the central arm 50 is fixed the socket 51 of a ball joint 52, the ball of which is rigid with a fork 53 carried by the selector and engagement shaft 22.

Two plates 54 and 55, on which the ends of the lateral arms 48 and 49 of the fork 47 rest, are fixed to the arms of the fork 53. In selecting the gears, the rotary movements of the rod 16 about its axis cause corresponding rotary movements of the shaft 22 about its axis by the action of one or other of the arms 48 and 49 of the fork 47 on the respective plate 54 or 55 rigid with the fork 53. In engaging the gears, the rod 16 causes the shaft 22 to undergo translational movements by virtue of the connection between the forks 47 and 53, formed by the ball joint 52.

This embodiment has the merit of being simpler than that of FIG. 1, while preserving the same functional advantages with the exception of the facility for amplifying the rotary movements of the shaft 22 with respect to the rotary movements of the gear lever 10.

I claim:

1. A device for manually controlling a motor vehicle change-speed gear unit having gear engagement rods, said device comprising a manually operable gear lever, means for rotatably supporting said gear lever in a vehicle structure, a connection rod pivoted at one end to said lever, and a selector and engagement shaft having an axis and supports, said selector and engagement shaft being rotatable and slidable in said supports in order to selectively engage with the gear engagement rods and operationally connected to said connection rod, said selector and engagement shaft being connected to said connection rod by a first motion transmission linkage which causes said selector and engagement shaft to rotate about its axis, and by a second motion transmission linkage which causes said selector and engagement shaft to translate along said axis, said first transmission linkage being of the articulated parallelogram type and including a first crank rigid with said connection rod, a second crank rigid with said selector and engagement shaft, and a bar ball-jointed to the two cranks.

2. A device as claimed in claim 1, said second motion transmission linkage comprises a lever having an end support, said lever being rotatable and slidable in said end support, said lever being pivoted relative to said connection rod and being hinged relative to said selector and engagement shaft.

3. A device as claimed in claim 2, wherein said lever is rotatably supported at its other end by a pin which is fixed to a fork rigid with a sleeve, said sleeve being rotatably supported by said connection rod to provide for said pivoting of said lever relative to said connection rod and being slidable together with said connection rod.

4. A device as claimed in claim 2, wherein there is rigid with said lever the socket of a ball joint, the ball of which is rigidly connected to said selector and engagement shaft, said ball joint providing for said hinging of said lever relative to said selector and engagement shaft.

5. A device for manually controlling a motor vehicle change-speed gear unit having gear engagement rods, said device comprising a manually operable gear lever, means for rotatably supporting said gear lever in a vehicle structure, a connection rod pivoted at one end to said lever, and a selector and engagement shaft having an axis and supports, said selector and engagement shaft being rotatable and slidable in said supports in order to selectively engage with the gear engagement rods and operationally connected to said connection rod, said selector and engagement shaft being connected to said connection rod by a first motion transmission linkage which causes said selector and engagement shaft to rotate about its axis, and by a second motion transmission linkage which causes said selector and engagement shaft to translate along said axis, a first fork rigid with said connection rod said first fork being provided with two lateral arms and a central arm, a second fork with two arms being rigid with said selector and engagement shaft, two plates rigid with said two arms of said second fork said two lateral arms of said first fork being engaged with said two plates, and there also being rigid with said two arms of said second fork a ball of a ball joint, said ball joint including a socket rigidly connected to said central arm of said first fork.

* * * * *